United States Patent [19]

Pinnau

[11] Patent Number: 4,871,378

[45] Date of Patent: Oct. 3, 1989

[54] ULTRATHIN ETHYLCELLULOSE/POLY(4-METHYLPENTENE-1) PERMSELECTIVE MEMBRANES

[75] Inventor: Ingo Pinnau, Austin, Tex.

[73] Assignee: Membrane Technology & Research, Inc., Menlo Park, Calif.

[21] Appl. No.: 131,875

[22] Filed: Dec. 11, 1987

[51] Int. Cl.$^4$ .............................................. B01D 53/22
[52] U.S. Cl. ........................................... 55/16; 55/68; 55/158; 264/48
[58] Field of Search .................... 55/16, 68, 158, 524; 210/490, 500.23, 500.29, 500.41, 506; 264/48

[56] References Cited

U.S. PATENT DOCUMENTS

| | | | |
|---|---|---|---|
| 3,767,737 | 10/1973 | Lundstrom et al. | 264/41 |
| 3,874,986 | 4/1975 | Browall et al. | 161/160 |
| 3,980,456 | 9/1976 | Browall | 55/16 X |
| 4,132,824 | 1/1979 | Kimura et al. | 55/158 X |
| 4,230,463 | 10/1980 | Henis et al. | 55/73 X |
| 4,243,701 | 1/1981 | Riley et al. | 427/244 |
| 4,277,344 | 7/1981 | Cadotte | 210/654 |
| 4,406,673 | 9/1983 | Yamada et al. | 55/158 X |
| 4,533,369 | 8/1985 | Okita | 55/16 X |
| 4,559,139 | 12/1985 | Uemura et al. | 210/500.41 X |
| 4,581,043 | 4/1986 | van der Sheer | 55/16 |
| 4,664,669 | 5/1987 | Ohyabu et al. | 55/16 X |
| 4,664,681 | 5/1987 | Anazawa et al. | 55/16 X |
| 4,681,605 | 7/1987 | Gollan | 55/16 X |
| 4,713,292 | 12/1987 | Takemura et al. | 55/158 X |

FOREIGN PATENT DOCUMENTS

| | | | |
|---|---|---|---|
| 152011 | 8/1985 | European Pat. Off. | 55/158 |
| 137303 | 8/1984 | Japan | 55/158 |
| 125424 | 6/1986 | Japan | 55/158 |
| 278330 | 12/1986 | Japan | 55/158 |
| 27025 | 2/1987 | Japan | 55/158 |
| 136224 | 6/1987 | Japan | 55/158 |

OTHER PUBLICATIONS

Loeb, S. & Sourirajan, S. "Sea Water Demineralization by Means of an Osmotic Membrane" Advances in Chemistry Series, 38, 117, 1963.

Ward, W. J., Browall, W. R., & Salemme, R. M., "Ultrathin Silicone/Polycarbonate Membranes for Gas Separation Processes", J. Memb. Sci. 1, 99–108, 1976.

Kesting, Robert E. "Phase Inversion Membranes", in Synthetic Polymeric Membranes, 2nd Ed., Chapter 7, 1985.

Strathmann, H., Kokc K., Amar, P., and Baker, R. W. "The Formation Mechanism of Asymmetric Membranes", Desalination, 16, 179–203, 1975.

Riley, R. L., Lonsdale, H. K., Lyons, C. R., & Merton, V. "Preparation of Ultrathin Reverse Osmosis Membranes & the Attainment of Theoretical Salt Rejection", J. Appl. Poly. Sci., 11, 2138–2143, 1967.

Kremen, S. S. "Technology & Engineering of ROGA Spiral-wound Reverse Osmosis Membrane Modules", in Reverse Osmosis & Synthetic Membranes, S. Sourirajan, Ed. Chapter 17, NRC, Canada, 1977.

Primary Examiner—Robert Spitzer
Attorney, Agent, or Firm—J. Farrant

[57] ABSTRACT

An ultrathin, permselective membrane for use in gas or vapor separations. The membrane comprises a permselective layer of ethylcellulose in combination with one or more permselective layers of poly(4-methylpentene-1). The permselective membrane is preferably coated onto a microporous substrate, such as an asymmetric Loeb-Sourirajan type membrane. The resulting membrane has high gas fluxes and selectivities, and can be used, for example, to separate oxygen and nitrogen; hydrogen sulfide from nitrogen, methane or carbon dioxide; hydrogen from nitrogen; sulfur dioxide or ammonia from nitrogen; or water vapor from air. A method of preparing such a membrane is also provided, as is a gas separation process using the membrane.

13 Claims, 3 Drawing Sheets

ULTRATHIN ETHYLCELLULOSE/POLY(4-METHYLPENTENE-1) PERMSELECTIVE MEMBRANES

FIELD OF THE INVENTION

The present invention relates to an ultrathin, permselective membrane for use in gas or vapor separations. The membrane comprises a permselective layer of ethylcellulose in combination with one or more permselective layers of poly(4-methylpentene-1). The invention also relates to a method of making such a membrane.

BACKGROUND OF THE INVENTION

A wide range of permselective membranes for gas separation is now known in the art, and commercial gas-separation membranes are beginning to challenge conventional technology in such areas as the production of oxygen-enriched air, nitrogen production for blanketing and other industrial applications, separation of carbon dioxide from methane, and hydrogen recovery from various gas mixtures.

The principal current types of high-performance gas-separation membranes have developed from the anisotropic cellulose acetate reverse-osmosis membranes of Loeb and Sourirajan. (S. Loeb and S. Sourirajan, "Sea Water Demineralization by Means of an Osmotic Membrane", *ACS Advances in Chemistry Series* 38, 117 (1963)) It is possible to make membranes with good characteristics in this way, and gas-separation membranes of this type have found some commercial application. However, the number of polymers that can be used to make good anisotropic membranes with high gas fluxes and selectivities is limited.

An alternative approach is to coat a Loeb-Sourirajan anisotropic membrane with a thin, permeable sealing layer as diclosed in U.S. Pat. No. 4,230,463 to Henis and Tripodi. The sealing layer, typically silicone rubber, does not function as a selective barrier, but rather serves to plug defects in the permselective membrane, and reduce to negligible amounts the gas flow through these defects. Because the selective layer no longer has to be completely defect-free, membranes of this type can be made thin more easily than regular Loeb-Sourirajan membranes. The increase in flux that is possible with a very thin permselective layer more than compensates for the slight loss in flux caused by the presence of the sealing layer. The selective layer must still be sufficiently thick to withstand normal operating pressures in use.

A third type of gas separation membrane is a composite structure in which the permselective membrane is coated directly onto a high permeability porous support membrane. In contrast to Loeb-Sourirajan membranes, the strength function is separated from the permselective function in this case. U.S. Pat. No. 4,243,701 to Riley and Grabowsky describes such membranes, as does a paper by Ward et al. (W. J. Ward III, W. R. Browall and R. M. Salemme, "Ultrathin Silicone/Polycarbonate Membranes for Gas Separation Processes", *J. Memb. Sci.* 1, 99 (1976). A disadvantage encountered with these membranes is that the permselective layer must be comparatively thick if a defect-free coating on the microporous support is to be achieved.

Another possible membrane structure is a three-layer composite in which strength, sealing and permselective functions are all separated and performed by different elements of the composite. The membrane substrate layer is a finely microporous support film that has no permselective properties but gives mechanical strength to the composite system. This substrate is coated with a thin rubbery sealing layer which plugs the support defects and provides a smooth surface onto which the top layer may be coated. With this configuration, the permselective layer may be extremely thin, and the resulting composite membrane can produce high permeate fluxes at modest pressures. U.S. Pat. No. 3,874,986 to Browall and Salemme discloses a membrane of this type with a permselective layer of polyphenylene oxide. Japanese Laid-Open Application 59-59214 describes another such membrane in which the permselective layer is polymethylpentene, and Japanese Laid-Open Application 59-112802 gives an example of this type of composite with polybutadiene permselective coating. It is also known in the art to apply yet another permeable coating on top of the permselective layer to protect it from physical damage, and composites of this type are disclosed for example in Japanese Laid-Open Applications 59-66308 and 60-137418. The general concept of coating a composite membrane with a rubbery top layer is disclosed in U.S. Pat. No. 3,980,456 to Browall. Multilayer composite membranes as described above give good results, but are more complex and costly to manufacture than simpler structures. It may be possible to design membrane configurations that give excellent results in small-scale test stamps, but are very difficult to produce in large sheets or rolls suitable for commercial use.

The teachings of the art also include diverse methods for making permselective membranes and membrane elements. Asymmetric Loeb-Sourirajan membranes are normally made by a phase-inversion casting process. Sealing or selective layers may be coated on a microporous support by solvent evaporation. U.S. Pat. No. 4,243,701 to Riley and Grabowski, for example, teaches a method of casting a thin permselective film on the surface of a porous support membrane by a solvent casting technique using halogenated hydrocarbon solvents. Alternatively, films as thin as 50 Angstroms may be prepared by spreading and stretching a polymer solution on water. References describing this liquid casting method include U.S. Pat. No. 3,767,737 to Lundstrom and U.S. Pat. No. 4,132,824 to Kimura et al. The films thus made may be picked up on or laminated to a microporous support by vacuum pick-up or other techniques known in the art.

Alternatively, a selective membrane may be formed in situ on the support membrane by interfacial polymerization. This method has found favor in the preparation of reverse osmosis membranes in particular, as disclosed for instance in U.S. Pat. Nos. 4,277,344 to Cadotte or 4,599,139 to Uemura and Kurihara. Plasma polymerization is yet another technique that may be applied to membrane preparation; U.S. Pat. No. 4,581,043 to van der Scheer covers a method of making gas separation membranes where the ultrathin selective layer is deposited by plasma polymerization.

In spite of the considerable research effort expended on the development of permselective membranes in recent years, the technology is still young, and considerable improvement in membrane performance is necessary before commercialization on a large scale will be possible. A significant problem encountered in making permselective membranes is that improved selectivities for one gas over another are generally obtained at the expense of permeability. Permeability is a measure of the rate at which a particular gas moves through a membrane of standard thickness under a standard pressure difference. In general, polymers that have a high permeability for a gas are not very selective for that gas over others, and highly selective materials are not very permeable. Consequently membrane materials that can give better separation performance than current membranes are needed. To be useful in the art, a polymer must not only have good intrinsic gas permeability and selectivity, but must also have suitable mechanical, thermal and chemical properties to enable it to be processed as a component of a composite membrane, and to withstand the normal operating conditions of that membrane. New polymeric materials with good intrinsic permeability and selectivity properties must be sought. Even when such a polymer is found, however, it may not possess the other necessary characteristics for a membrane material, or the technology required to utilize it may be lacking.

In general, glassy polymers have higher intrinsic selectivities and lower permeabilities than rubbery polymers. Thus to obtain a permselective membrane, made from a glassy material, that has a sufficiently high permeant flux to be of practical use in gas separation applications, it is necessary to make the permselective layer very thin, typically less than 1 micron in thickness. However, it is extremely difficult to coat such thin films on a microporous substrate without forming pinholes or other defects that ruin the selectivity. Thus the various approaches described above, involving the use of rubbery layers above or below the permselective layer, have arisen. There remains a need in the art for materials and techniques that can provide simply made, high-performance, gas separation membranes, without the use of additional sealing or protective layers. The present invention addresses this need.

SUMMARY OF THE INVENTION

It is an object of the present invention then to make available ultrathin multilayer ethylcellulose/poly(4-methylpentene-1) composite membranes for application in gas or vapor separations.

It is another object of the invention to provide a method of making ultrathin ethylcellulose/poly(4-methylpentene-1) composite membranes.

Additional objects and advantages will be apparent from the description of the invention to those skilled in the art.

To achieve the foregoing objectives, the ethylcellulose which constitutes part of the membrane of the present invention consists of a repeating unit represented by the formula:

for example as Ethocel ® from Dow Chemical, Midland, Mich. 48640. The most widely used commercial ethylcelluloses contain 2.25 to 2.58 ethoxyl groups per anhydroglucose unit, corresponding to an ethoxyl content of 45.0% to 49.5%. However, ethylcelluloses with an ethoxyl content lower or higher than this are also encompassed by the invention. It is known in the art that ethylcellulose is soluble in various standard organic solvents, e.g. chlorinated aliphatic hydrocarbons, monohydric aliphatic alcohols, monohydric cyclic alcohols, ethers, esters and ketones. Consequently its suitability as a candidate for making semipermeable membranes has been investigated, and such membranes, comprised of relatively thick films, are known for application in reverse osmosis, for example. However, prior to the present invention, applicants believe that it has not been known in the art to solvent cast ultrathin ($<0.5$ micron thick) ethylcellulose membranes that are essentially defect-free, and thus suitable for gas separation applications.

Poly(4-methylpentene-1) is manufactured by Mitsui Petrochemical Industries, N.Y., and sold under the trade name "TPX" ®. Poly(4-methylpentene-1) is a polyolefin of the following composition:

It is known in the art to make gas separation membranes from polymethylpentenes by solvent casting, such a process being described for example in U.S. Pat. No. 4,415,608. However the improvement in gas separation performance that can be obtained by the combination of two permselective layers of ethylcellulose and poly(4-methylpentene-1) has not previously been known. To form the ultrathin membranes of the invention, the ethylcellulose must first be dissolved in an appropriate solvent. The ethylcellulose may then be cast alone, or more preferably may be coated as one layer of an ethylcellulose/poly(4-methylpentene-1) multilayer composite membrane. The poly(4-methylpentene-1) must likewise be dissolved in an appropriate solvent and coated onto the ethylcellulose layer. The solvent chosen to dissolve the poly(4-methylpentene-1) constituent of the invention should thus be one that does not attack the underlying ethylcellulose layer.

The configuration of the finished membrane is not critical. The membrane may be in flat sheet or hollow fiber form, and may be used in a plate and frame, spiral-wound module or hollow-fiber module arrangement.

DETAILED DESCRIPTION OF THE INVENTION

The term permselective as used herein refers to polymers, or membranes made from those polymers, that exhibit selective permeation for at least one gas in a mixture over another gas in that mixture, enabling a measure of separation between those gases to be achieved.

The term multilayer as used herein means comprising a support membrane and one or more coating layers.

The term ideal separation factor as used herein means the separation factor of a membrane or membrane element for one gas over another as determined with tests using pure gas samples rather than gas mixtures.

The present invention is concerned with the use of ethylcellulose/poly(4-methylpentene-1) composite membranes for gas and vapor separations. Ethylcellulose consists essentially of repeating units having the general formula:

This polymer is available commercially as Ethocel ® from Dow Chemical, Midland, Mich., 48640. Ethylcellulose according to the present invention should most preferably contain 2.25 to 2.58 ethoxyl groups per anhydroglucose units, corresponding to an ethoxyl content of 45% to 49.5%. Optionally other grades of ethylcellulose outside this range may be used.

Poly(4-methylpentene-1) is a polyolefin of the following composition:

and commercially available as "TPX" ® from Mitsui Petrochemicals, N.Y.

Figure 1:
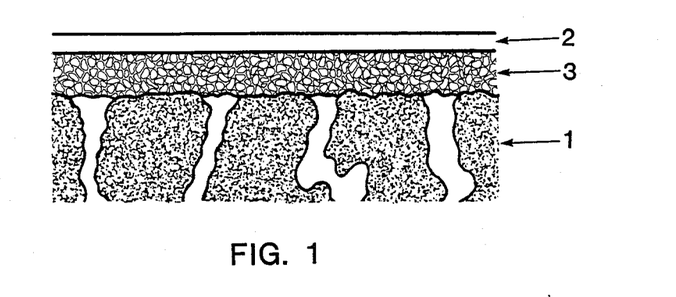
FIG. 1 is a schematic representation of a preferred embodiment of the invention comprising a microporous support membrane, a permselective ethylcellulose layer, and a permselective poly(4-methylpentene-1) permselective layer.
Figure 2:
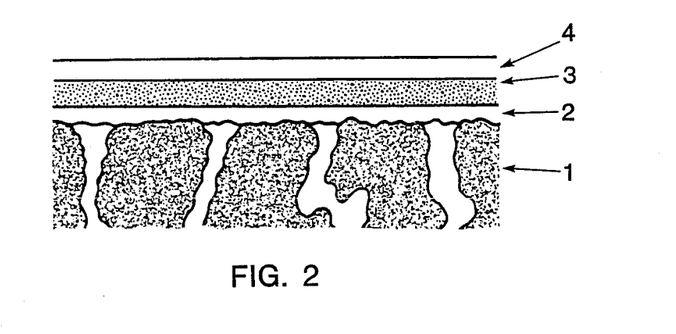
FIG. 2 is a schematic representation of an alternative embodiment of the invention comprising a microporous support membrane, a permselective ethylcellulose layer, a permselective poly(4-methylpentene-1) layer, and a permselective ethylcellulose top layer.

Referring now to the drawings, FIG. 1 shows a preferred embodiment of the invention comprising a microporous support membrane 1, onto which is coated an ultrathin permselective ethylcellulose layer, 2, and an ultrathin permselective poly(4-methylpentene-1) layer, 3. FIG. 2 shows an alternative embodiment comprising a microporous support membrane 1, an ultrathin permselective ethylcellulose layer, 2, an ultrathin permselective poly(4-methylpentene-1) layer, and another ultrathin permselective ethylcellulose layer, 4.

In each case, the function of the microporous support membrane is to give physical strength to the composite structure, and it has no selective properties per se. It should have a very small flow resistance compared to the permselective layer. Preferably the permeability of the microporous support material will be at least ten times the permeability of the membrane-coated microporous support. Preferably, the microporous support membrane will be an asymmetric membrane with a relatively dense surface layer. The surface pore size should be sufficiently small that the sealing or permselective polymer can form a continuous coating that bridges or plugs the pores without defects. Normally a surface pore size of 1 micron or less is preferred. Techniques for casting finely microporous membranes are well known in the art, and are discussed in detail, for example, in *Synthetic Polymeric Membranes*, Second Edition, Robert E. Kesting, McGraw-Hill, N.Y. (1985), Chapter 7, incorporated herein by reference. The choice of polymer used to make the microporous support, while not critical to the invention, is important. The physical properties of the support should contribute sufficient mechanical strength to the composite that it can withstand prolonged exposure to the pressure differences under which gas separation membranes operate, typically up to 1500 psi. It should be thermally stable over approximately the same temperature range as the permselective or sealing layers to be used. It should be capable of forming a smooth surface onto which the other layers of the composite may be coated, and it should be able to withstand attack by the solvents used to apply the subsequent layers. Suitable polymers that may be used to make the microporous membrane include, but are not limited to polysulfones, such as Udel ® P3500 (Union Carbide, Danbury, Conn.) or more preferably a polyamide, for example Nomex ® (DuPont, Wilmington, Del.), Trogamid-T ® (Dynamit Nobel, Rockleigh, N.J.).

Other suitable materials are crosslinked polyimides, or polyetherether ketones, such as Victrex ® (ICI Americas Inc., Wilmington, Del.) or UltrasonE ® (BASF, Ludwigshafen, West Germany). Some commercially available membranes might be usable in this context, depending on their solvent resistance. Examples include the NTU ® 3050, a solvent resistant ultrafiltration membrane, and the NTU ® 4220, both available from Nitto Electric Industrial Co., Osaka, Japan. Optionally, other possible support membranes are to be found among those described in an article by H. Strathmann, K. Kock, P. Amar and R. W. Baker, in "The Formation Mechanism of Asymmetric Membranes", *Desalination* 16, 175 (1975). Further examples of polymers which may be used to prepare the microporous support layer may be found among those listed in U.S. Pat. No. 4,230,463 to Henis and Tripodi, column 14, lines 14 through 54, which is incorporated herein by reference. The support membrane should be sufficiently thick to provide some physical robustness to the composite, but not so thick as to impair the permeability characteristics. Generally a thickness of 30-200 microns, is envisaged, with a preferred thickness of approximately 50 microns.

To coat the microporous support with the desired ethylcellulose, it is necessary to prepare a dilute solution of the polymer. Solvents that may be used to dissolve ethylcellulose include esters, ketones, and chlorinated aliphatic hydrocarbons. Preferred solvents are monohydric aliphatic alcohols. Particularly suited as a solvent for ethylcellulose according to the invention is 2-propanol. Solutions of ethylcellulose in 2-propanol in the 5 wt% range are essentially gels at room temperature, but more dilute solutions are stable. It has unexpectedly been found that such dilute solutions of ethylcellulose in 2-propanol have excellent coating characteristics when applied to a microporous suport. Typically the solutions should contain 5 wt% polymer or less, preferably 2 wt% polymer or less, and more preferably 0.5 wt% polymer or less. On evaporation of the solvent, a very thin film of polymer is left behind. The solution gels almost instantly as the solvent evaporates, so the polymerr film thus formed does not soak into the pores of the microporous support nor break up by surface tension effects. Thus the property of these polymer solutions of gelling at low concentrations results in a selective layer that is highly defect-free, without the need to use an intermediate or top sealing layer. Solutions that only gel at higher polymer concentrations do not have this advantage, because after evaporation the resulting membrane is relatively thick, with correspondingly low flux. Low-viscosity, spreadable solutions that do not gel may penetrate the pores of the support membrane rather than spanning them, resulting in defects in the permselective coat. Thus the unusual combination of spreadability and low-concentration gelling means that these polymer solutions represent a major improvement in membrane-making methods and membrane materials.

When ethylcellulose composite membranes are formed as described above, it is found that the resulting membrane is defect-free and therefore useful in the separation of gases or vapors. However, a major feature of the present invention is the use of an additional permselective poly(4-methylpentene-1) layer coated onto the ethylcellulose composite membrane. This poly(4-methylpentene-1) layer serves as a permselective layer, not as a protective layer as disclosed for example in U.S. Pat. No. 3,980,456, nor as a simple seal for defects as in U.S. Pat. No. 4,230,463. Thus a combined ethylcellulose/poly(4-methylpentene-1) permselective membrane gives superior gas separation characteristics than those that can be obtained from either ethylcellulose or poly(4-methylpentene-1) over- or under-coated with a less selective material such as silicone rubber.

Figure 3:
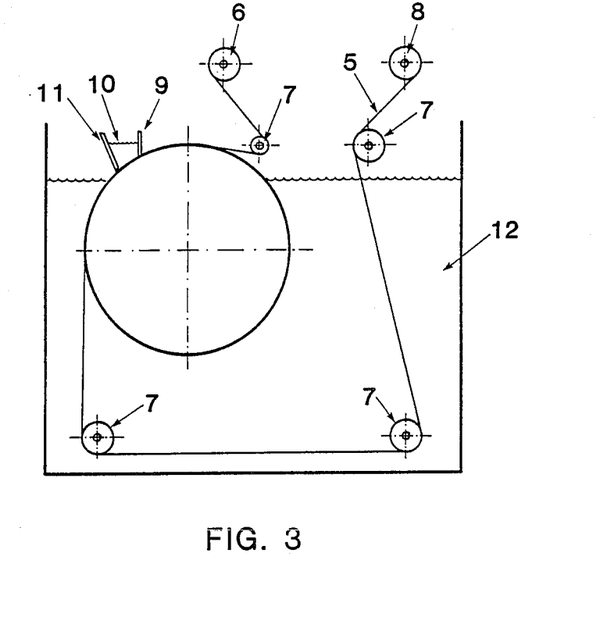
FIG. 3 is a schematic representation of a Loeb-Sourirajan membrane casting machine.

To prepare the preferred embodiment of the invention shown in FIG. 1, the microporous support membrane must first be cast. FIG. 3 is a schematic representation of a membrane casting machine, developed for making asymmetric Loeb-Sourirajan reverse osmosis membranes, that may be used to continuously cast the support membranes of the present invention onto a moving belt of polyester, or like, fabric. Referring now to this figure, a moving belt of the fabric web, 5, feeds from the fabric roll 6, across a series of rollers 7, to the take-up roll 8. A trough 9, contains the casting solution 10, which consists of a polymer solution dissolved in a water miscible solvent. The casting solution is doctored onto the moving fabric belt by a blade 11. The belt then passes into a water bath 12 which precipitates the polymer to form the membrane. The belt is collected on the take-up roll 8, after which the membrane is washed overnight to remove any remaining solvent and finally dried.

Figure 4:
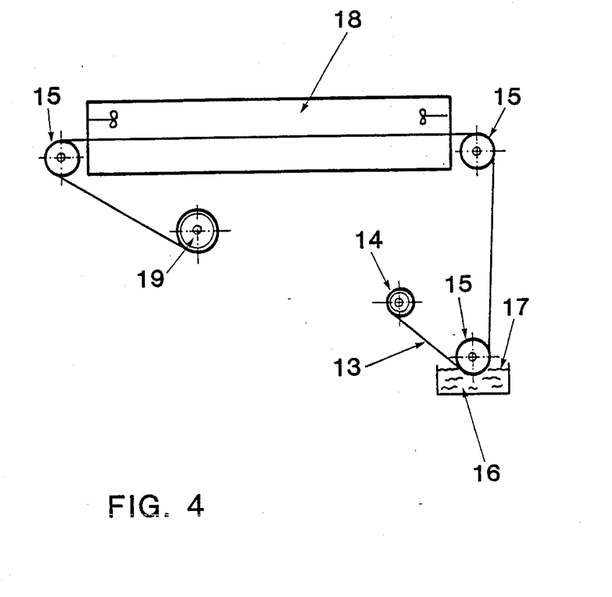
FIG. 4 is a schematic representation of a dip-coating apparatus used to prepare composite membranes.

Thin film composite membranes may then be constructed on the microporous support by a number of techniques known in the art. The preferred method in the context of the present invention is solution coating. The principles of this method are described in detail in, for example, a paper by R. L. Riley, H. K. Lonsdale, D. R. Lyons and U. Merten, entitled "Preparation of Ultrathin Reverse Osmosis Membranes and the Attainment of the Theoretical Salt Rejection" in *J. Appl. Poly. Sci.* 11, 2143, 1967; and in a recent U.S. Pat. No. 4,243,701 to R. L. Riley and R. L. Grabowsky. To apply this method to the present invention, it is necessary to prepare a dilute solution of ethylcellulose. Depending on the ethoxyl content of the ethylcellulose to be used, possible solvents that may be tried include chlorinated aliphatic hydrocarbons, such as chloroform, carbon tetrachloride, ethylene dichloride, trichloroethylene, trichloroethane, perchloroethylene, tetrachloroethane and methylene chloride; esters such as methylacetate, ethylacetate, isopropyl acetate, sec-butyl acetate, isobutyl acetate, n-butyl acetate, and sec-amyl acetate; ethers such as dioxane; monohydric cyclic alcohols such as furfuryl alcohol and benzyl alcohol. The preferred solvents are monohydric aliphatic alcohols, such as methanol, ethanol, and most preferably 2-propanol, n-butanol, sec-butanol, t-butanol, and n-pentanol. A thin film of the polymer solution is deposited on the microporous support surface by immersing and then slowly withdrawing the support from the solution. When the solvent evaporates, an extremely thin polymer layer is left behind. FIG. 4 is a schematic representation of a simple dip-coating apparatus, which can be used to deposit the ultrathin, permselective ethylcellulose layer and any other optional coating layers. The embodiment shown in FIG. 1 is prepared in the following way with refernce to FIG. 4. The support membrane 13, passes from the feed roll 14 across a series of rollers 15. The dip coating tank 16 contains a dilute solution 17, of the polymer to be deposited, which coats the travelling membrane support with a liquid layer 50 to 100 microns thick. The membrane then passes through a drying oven 18 and is wound up on a variable-speed, motor-driven take-up roll 19. After evaporation of the solvent, a polymer film 0.1 to 20 microns thick is left on the membrane. The thickness and the number of defects in the coating depend on the concentration and viscosity of the solutions involved, the nature of the support membrane and the application parameters of the process. With the polymers of the present invention, the concentration in solution will be 5 wt% or less, and the coating solution temperature should be in the range 0° C. to 90° C., preferably 0° C. to 40° C. The thickness of the permselective membrane after solvent evaporation should be 0.1 to 20 microns, preferably 5 microns or less, and more preferably 0.1 to 1 micron.

As described above, ethylcellulose composite membranes according to the present invention are defect-free. Therefore the solvent used for the poly(4-methylpentene-1) layer should not attack the underlying ethylcellulose layer. A solvent that attacks the ethylcellulose layer would induce cracks and pinholes that might not be bridged by the poly(4-methylpentene-1) layer. This would lead to membranes with low selectivity, because pinholes of the order of 5 Angstroms diameter drastically reduce the performance of gas separation membranes. The preferred solvents for poly(4-methylpentene-1) according to this invention are aliphatic hydrocarbons and hydroaromatic hydrocarbons, particularly cyclohexane. Poly(4-methylpentene-1) dissolved in cyclohexane can easily be coated onto the basic ethylcellulose composite without swelling or dissolving the ethylcellulose layer. The poly(4-methylpentene-1) permselective layer is coated onto the ethylcellulose layer by repeating the dip-coating step described above. The concentration of poly(4-methylpentene-1) in solution should be 5 wt% or less, and the coating temperature should be in the range 10° to 70° C., preferably 20° to 30° C. The thickness of poly(4-methylpentene-1) layer after evaporation of the solvent should be 0.1 to 20 microns, preferably 5 microns or less, and most preferably 0.1 to 0.5 microns.

The optional embodiment shown in FIG. 2 is prepared in a similar way, by first coating the microporous support with an ethylcellulose layer, overcoating with a poly(4-methylpentene-1) layer, and recoating with another ethylcellulose layer.

Once formed, the composite membranes of the invention may be used in any separation device known in the art of membrane gas separation. A preferred configuration for the finished composite membrane is a spiral-wound module. The making of such modules is well-known in the art, and is described in detail in, for instance, in S. S. Kremen, "Technology and Engineering of ROGA Spiral Wound Reverse Osmosis Membrane Modules", in *Reverse Osmosis and Synthetic Membranes* S. Sourirajan (Ed). National Research Council of Canada, Ottawa (1977). Alternatively, the membranes may be used in a flat sheet plate-and-frame configuration.

The uses of the present invention include separation of one or more gases or vapors from a mixture of gases or vapors. It is envisaged that a particularly valuable application of the invention will be in the separation of oxygen from nitrogen. Non-limiting examples of gas separations that could be accomplished with the membranes of the present invention include hydrogen sulfide from nitrogen, methane or carbon dioxide; carbon dioxide from nitrogen, methane and oxygen; hydrogen from nitrogen; sulfur dioxide or ammonia from nitrogen; and water vapor from air.

The invention is now described in further detail with reference to Examples 1 to 7, which are intended to be illustrative of the invention without limiting the scope in any way.

EXAMPLE 1

An anisotropic microporous support membrane was cast using the Loeb-Sourirajan technique discussed above. The casting solution was 17.5 wt% Udel P3500 polysulfone in 82.5 wt% dimethylformamide, the casting speed of the machine was 3.5 m/min and the knife gap was set at 178 microns. The membrane was cast onto a non-woven fabric. The membranes were precipitated in water, washed for 24 hours, and dried in an oven at 80°-100° C. The nitrogen normalized flux of the microporous polysulfone membrane was determined to be $1.5 \times 10^{-2} cm^3(STP)/cm^2 sec \cdot cmHg$ with an $O_2/N_2$ selectivity of 0.95.

A composite membrane was made by coating a solution of 1 wt% ethylcellulose "Ethocel S-100" in 2-propanol onto the skin side of the anisotropic membrane using a dip method as described above. The ethylcellulose solution was applied at a temperature of 25° C., and the composite membrane was dried by passing through an oven at 60° C. for 1-5 minutes. The ideal separation factor for the composite membrane was determined by measuring the gas flux of pure gases at a pressure of 50 psig and temperature of 20° C. The membrane area was 12.6 cm². The ethylcellulose membrane showed a normalized oxygen flux of $8.7 \times 10^{-5} cm^3(STP)/cm^2 sec \cdot cmHg$, and an $O_2/N_2$ selectivity of 3.4. According to Table 1, the $O_2/N_2$ selectivity of the composite membrane is as high as that of a homogeneous ethylcellulose film. Thus the thin-film composites of this example can be considered defect-free.

TABLE 1

| Permeability and selectivity data for ethylcellulose films. | | | |
|---|---|---|---|
| Film | Permeability coefficient $cm^3(STP)cm/cm^2sec \cdot cmHg$ | | Selectivity $O_2/N_2$ |
| | $O_2$ | $N_2$ | |
| Literature value* | $26.5 \times 10^{-10}$ | $8.4 \times 10^{-10}$ | 3.2 |
| | Normalized flux $cm^3(STP)/cm^2sec \cdot cmHg$ | | |
| | $O_2$ | $N_2$ | |
| Example 1 (membrane) | $8.7 \times 10^{-5}$ | — | 3.4 |

*Reference: H. Yasuda and V. Stannett, "Permeability Coefficients", Polymer Handbook, J. Brandrup, E. H. Immergut, Eds., John Wiley, New York, 1975.

EXAMPLE 2

Multilayer ethylcellulose/poly(4-methylpentene-1) composite membranes were prepared as follows. Composite membranes were prepared as in Example 1 with varying ethylcellulose concentrations in 2-propanol. These membranes were overcoated with "TPX MX002" (Mitsui Petrochemicals, N.Y.) in cyclohexane solutions of varying concentration. The results obtained are shown in Table 2.

TABLE 2

| Permeation properties of ethylcellulose/poly (4-methylpentene-1) multilayer composite membranes. | | | |
|---|---|---|---|
| First coating | Second coating | $O_2$ flux $cm^3(STP)/cm^2 sec \cdot cmHg$ | Selectivity $O_2/N_2$ |
| 0.3 wt % EC | 0.3 wt % TPX | $7.6 \times 10^{-5}$ | 4.1 |
| 0.2 wt % EC | 0.15 wt % TPX | $8.5 \times 10^{-5}$ | 3.7 |
| 0.35 wt % EC | 0.5 wt % TPX | $5.7 \times 10^{-5}$ | 4.0 |
| 0.35 wt % EC | 1.0 wt % TPX | $4.1 \times 10^{-5}$ | 4.3 |
| Homogeneous poly (4-methylpentene-1) film | | $32.3 \times 10^{-8}$** | 4.1 |

EC = ethylcellulose;
TPX = poly(4-methylpentene-1)
**Permeability in $cm^3(STP)cm/cm^2sec \cdot cmHg$. Reference: H. Yasuda and V. Stannett, "Permeability Coefficients", Polymer Handbook, J. Brandrup, E. H. Immergut, Eds., John Wiley, New York, 1975.

Comparing these results with Example 1, it may be seen that the addition of a poly(4-methylpentene-1) top layer increases the selectivity of the ethylcellulose composite membrane. Furthermore, the overall selectivity of the multilayer composite of Example 2 is as high as that of homogeneous poly(4-methylpentene-1) films according to the literature. Therefore, we assume that the poly(4-methylpentene-1) layer is defect-free.

EXAMPLE 3

Multilayer composite membranes were prepared as described in Example 2, except that two coatings of poly(4-methylpentene-1) were applied to the basic ethylcellulose composite membrane. The permeation properties for the resulting membranes are shown in Table 3.

TABLE 3

Performance of ethylcellulose/poly(4-methylpentene-1) multilayer composite membranes.

| First coating | Second coating | $O_2$ flux $cm^3(STP)/cm^2sec \cdot cmHg$ | Selectivity $O_2/N_2$ |
|---|---|---|---|
| 0.2 wt % EC | 2 × 0.1 wt % TPX | $8.0 \times 10^{-5}$ | 4.0 |
| 0.15 wt % EC | 2 × 0.15 wt % TPX | $6.1 \times 10^{-5}$ | 4.6 |
| 0.25 wt % EC | 2 × 0.1 wt % TPX | $7.3 \times 10^{-5}$ | 4.4 |

EC = ethylcellulose;
TPX = poly(4-methylpentene-1)

EXAMPLE 4

To get information about the importance of ethylcellulose as the first permselective layer, and the possible influence of 2-propanol on the microporous polysulfone support membrane, a membrane was prepared in the following way. A microporous polysulfone membrane made as described in Example 1 was treated with 2-propanol on its skin side using a dip method. After drying the treated polysulfone membrane, two dip coatings of 0.1 wt% TPX MX002 in cyclohexane were applied. The membrane was tested with nitrogen and oxygen at 25° C. and 50 psig. Membrane samples showed normalized nitrogen fluxes of $1 \times 10^{-2} cm^3(STP)/cm^2sec.cmHg$ and an $O_2/N_2$ selectivity of 0.98. According to these results, 2-propanol does not affect the properties of the microporous support membrane. Furthermore, the experiment showed that it was not possible to prepare ultrathin, defect-free poly(4-methylpentene-1) membranes directly on the microporous support.

EXAMPLE 5

The optional embodiment shown in FIG. 2 was prepared by dip coating a microporous polysulfone membrane as in Example 1 first with 0.35 wt% ethylcellulose "Ethocel Standard-100" in 2-propanol. After drying, a second coat of 0.25 wt% poly(4-methylpentene-1) "TPX MX 002" in cyclohexane was applied. After drying, a third coat of the same 0.35 wt% ethylcellulose solution was applied. The membrane was tested with pure gases at a temperature of 25° C. and pressure of 50 psig, and showed a normalized oxygen flux of $6.8 \times 10^{-5} cm^3(STP)/cm^2sec.cmHg$, and an oxygen/nitrogen selectivity of 4.1.

EXAMPLE 6

Ethylcellulose/poly(4-methylpentene-1) multilayer composite membranes were prepared as described in Example 3, using one coat of 0.2 wt% ethylcellulose in 2-propanol, and two coats of 0.1 wt% poly(4-methylpentene-1) in cyclohexane. Membrane samples were taken to get information about reproducibility and uniformity of the multilayer membranes of the invention. The results are shown in Table 4.

TABLE 4

Performance of continuously prepared ethylcellulose/poly(4-methylpentene-1) multilayer composite membranes.

| Sample | $N_2$ flux $cm^3(STP)/cm^2sec \cdot cmHG$ | $O_2$ flux | Selectivity $O_2/N_2$ |
|---|---|---|---|
| 1 | $2.3 \times 10^{-5}$ | $9.0 \times 10^{-5}$ | 3.9 |
| 2 | $2.2 \times 10^{-5}$ | $8.8 \times 10^{-5}$ | 4.0 |
| 3 | $2.3 \times 10^{-5}$ | $9.0 \times 10^{-5}$ | 3.9 |
| 4 | $1.7 \times 10^{-5}$ | $7.0 \times 10^{-5}$ | 4.1 |
| 5 | $1.8 \times 10^{-5}$ | $7.5 \times 10^{-5}$ | 4.2 |
| 6 | $1.9 \times 10^{-5}$ | $7.5 \times 10^{-5}$ | 3.9 |
| 7 | $2.3 \times 10^{-5}$ | $8.6 \times 10^{-5}$ | 3.7 |
| 8 | $2.1 \times 10^{-5}$ | $8.3 \times 10^{-5}$ | 4.0 |
| 9 | $2.0 \times 10^{-5}$ | $7.9 \times 10^{-5}$ | 4.0 |
| 10 | $1.9 \times 10^{-5}$ | $7.3 \times 10^{-5}$ | 3.8 |
| 11 | $2.1 \times 10^{-5}$ | $8.1 \times 10^{-5}$ | 3.9 |
| 12 | $2.0 \times 10^{-5}$ | $7.8 \times 10^{-5}$ | 3.9 |
| 13 | $2.2 \times 10^{-5}$ | $8.8 \times 10^{-5}$ | 4.0 |
| 14 | $2.0 \times 10^{-5}$ | $8.0 \times 10^{-5}$ | 4.0 |
| 15 | $2.0 \times 10^{-5}$ | $7.6 \times 10^{-5}$ | 3.8 |
| 16 | $2.0 \times 10^{-5}$ | $8.0 \times 10^{-5}$ | 4.0 |
| 17 | $2.1 \times 10^{-5}$ | $8.2 \times 10^{-5}$ | 3.9 |
| 18 | $2.0 \times 10^{-5}$ | $7.9 \times 10^{-5}$ | 4.0 |
| 19 | $2.0 \times 10^{-5}$ | $7.7 \times 10^{-5}$ | 4.0 |
| 20 | $2.1 \times 10^{-5}$ | $8.2 \times 10^{-5}$ | 3.9 |

According to these results the overall thickness of the permselective, defect-free ethylcellulose/poly(4-methylpentene-1) layers is between 0.3 and 0.4 microns.

The membrane described above was rolled into a spiral-wound module with an effective membrane area of 2000 $cm^2$. The module was tested with pure gases at 25° C. and various feed pressures. Table 5 summarizes the results.

TABLE 5

Performance of an ethylcellulose/poly(4-methylpentene-1) crossflow spiral-wound module.

| Feed pressure psig | Gas flux $cm^3(STP)/cm^2sec \cdot cmHg$ | | | Selectivity | |
|---|---|---|---|---|---|
| | $N_2$ | $O_2$ | $H_2$ | $O_2/N_2$ | $H_2/N_2$ |
| 15 | 0.0322 | 0.131 | — | 4.1 | — |
| 100 | 0.0355 | — | — | — | — |
| 15 | 0.0357 | 0.145 | 0.893 | 4.1 | 25 |

Additional permeation experiments were carried out with the ethylcellulose/poly(4-methylpentene-1) spiral-wound module using air as a gas mixture. The module obtained 50 vol% oxygen on the permeate side at 185 psig feed pressure and a stage cut close to zero. These results show that the ethylcellulose/poly(4-methylpentene-1) multilayer composite membrane can easily be formed into module configurations and is mechanically stable up to feed pressures of several hundred psig.

EXAMPLE 7

A microporous support membrane was cast as in Example 1. To compare the effects of poly(4-methylpentene-1) and silicone rubber as constituents of multilayer composite membranes, a range of multilayer membranes was prepared using the dip coating technique described above. The results are shown in Table 6 below.

TABLE 6

Comparative performance of a range of multilayer composite membranes

| Sample | First layer | Second layer | Third layer | $O_2$ flux $cm^3(STP)/cm^2sec \cdot cmHg$ | Selectivity $O_2/N_2$ |
|---|---|---|---|---|---|
| 1 | 0.5 wt % EC | 1 wt % SR | 0.5 wt % EC | $1.3 \times 10^{-4}$ | 3.2 |
| 2 | 0.25 wt % EC | 0.25 wt % TPX | — | $7.8 \times 10^{-5}$ | 4.2 |
| 3 | 0.25 wt % EC | 0.25 wt % TPX | 1 wt % SR | $9.1 \times 10^{-5}$ | 3.2 |
| 4 | 0.3 wt % EC | 0.3 wt % TPX | — | $7.0 \times 10^{-5}$ | 4.2 |
| 5 | 0.3 wt % EC | 0.3 wt % TPX | 1 wt % SR | $1.1 \times 10^{-4}$ | 3.6 |
| 6 | 1 wt % SR | 0.3 wt % EC | 0.3 wt % TPX | $1.2 \times 10^{-4}$ | 3.3 |

EC = ethylcellulose;
TPX = poly(4-methylpentene-1);
SR = silicone rubber Sample 1, ethylcellulose and silicone rubber, had a slightly higher oxygen flux, but poorer selectivity, compared with the composites of the invention.

By comparing samples 2 and 3, it may be seen that overcoating the membranes of the invention with a top coat of silicone rubber, unexpectedly destroyed the poly(4-methylpentene-1) layer. A similar result is observed by comparing samples 4 and 5. The result of sample 6 is comparable with sample 1, i.e. higher oxygen flux, but lower oxygen/nitrogen selectivity.

I claim:

1. A membrane useful for gas separation, comprising: an ultrathin, permselective ethylcellulose layer having the general formula wherein the ethoxyl content is in the range 35% to 50%; and an ultrathin, permselective poly(4-methylpentene-1) layer having the formula said poly(4-methylpentene-1) layer forming a coating on one surface of said ethylcellulose layer, said membrane having an $O_2/N_2$ selectivity which is greater than the intrinsic $O_2/N_2$ selectivity of said ethylcellulose and which is greater than 90% of the intrinsic $O_2/N_2$ selectivity of said poly(4-methylpentene-1).

2. The membrane of claim 1, further comprising a microporous support membrane, said ethylcellulose layer forming a coating on one side of said support membrane.

3. The membrane of claim 1, wherein said ethylcellulose layer is less than 2 microns thick.

4. The membrane of claim 1, wherein said poly(4-methylpentene-1) layer is less than 2 microns thick.

5. A process for separating a gas A from a gas B in a first gas mixture containing A and B, comprising the steps of:
contacting the feed side of the membrane of claim 1 with said gas mixture; and
withdrawing from the permeate side of said membrane a second gas mixture wherein the proportion of gas A is enriched, and the proportion of gas B depleted, compared to said first gas mixture.

6. A process for producing a membrane useful for gas separation comprising the steps of:
preparing an ethylcellulose solution from ethylcellulose having the general formula wherein the ethoxyl content is in the range 35% to 50%;
coating said ethylcellulose solution onto a support;
drying said coated support, to produce a first ultrathin, permselective layer of ethylcellulose;
preparing a poly(4-methylpentene-1) solution from poly(4methylpentene-1) having the formula coating said poly(4-methylpentene-1) solution onto said coated support; and drying said coated support, to produce a second ultrathin, permselective layer of poly(4-methylpentene-1, whereby a composite membrane, having an $O_2/N_2$ selectivity which is greater than the intrinsic $O_2/N_2$ selectivity of said ethylcellulose and which is greater than 90% of the intrinsic $O_2/N_2$ selectivity of said poly(4-methylpentene-1), is formed.

7. The process as in claim 6, wherein said ethylcellulose solution contains a maximum ethylcellulose concentration of 5 wt%.

8. The process as in claim 6, wherein said ethylcellulose solution contains a maximum ethylcellulose concentration of 2 wt%.

9. The process as in claim 6, wherein said ethylcellulose solution comprises ethylcellulose having the general formula wherein the ethoxyl content is in the range 35% to 50%, dissolved in a monohydric aliphatic alcohol.

10. The process as in claim 9, wherein said monohydric aliphatic alcohol is 2-propanol.

11. The process as in claim 6, wherein said poly(4-methylpentene-1) solution contains a maximum poly(4-methylpentene-1) concentration of 5 wt%.

12. The process as in claim 6, wherein said poly(4-methylpentene-1) solution contains a maximum poly(4-methylpentene-1) concentration of 2 wt%.

13. The process as in claim 6, wherein said poly(4-methylpentene-1) solution comprises poly(4-methylpentene-1) dissolved in cyclohexane.

* * * * *